US011167445B2

(12) United States Patent
Stefani

(10) Patent No.: US 11,167,445 B2
(45) Date of Patent: Nov. 9, 2021

(54) FEEDING DEVICE FOR A PRESS

(71) Applicant: SYSTEM S.P.A., Fiorano Modense (IT)

(72) Inventor: Franco Stefani, Sassuolo (IT)

(73) Assignee: SYSTEM CERAMICS S.P.A., Fiorano Modenese (IT)

( * ) Notice: Subject to any disclaimer, the term of this patent is extended or adjusted under 35 U.S.C. 154(b) by 384 days.

(21) Appl. No.: 15/759,360

(22) PCT Filed: Sep. 9, 2016

(86) PCT No.: PCT/IB2016/055392
§ 371 (c)(1),
(2) Date: Mar. 12, 2018

(87) PCT Pub. No.: WO2017/051275
PCT Pub. Date: Mar. 30, 2017

(65) Prior Publication Data

US 2018/0250846 A1 Sep. 6, 2018

(30) Foreign Application Priority Data

Sep. 22, 2015 (IT) ........................ 102015000053920

(51) Int. Cl.

| | |
|---|---|
| ***B29C 43/34*** | (2006.01) |
| ***B28B 13/02*** | (2006.01) |
| ***B28B 3/02*** | (2006.01) |
| ***B28B 5/02*** | (2006.01) |

(52) U.S. Cl.
CPC ................ *B28B 13/02* (2013.01); *B28B 3/02* (2013.01); *B28B 5/021* (2013.01); *B28B 13/0215* (2013.01)

(58) Field of Classification Search
CPC ..... B29C 43/02; B29C 43/34; B29C 43/3416; B28B 1/14; B28B 1/26
See application file for complete search history.

(56) References Cited

U.S. PATENT DOCUMENTS

| | | | | |
|---|---|---|---|---|
| 5,088,592 A | 2/1992 | Palmers | | |
| 9,327,915 B1 * | 5/2016 | Sammauro | ............. | B65G 47/66 |
| 2010/0136156 A1 * | 6/2010 | Bergling | ................. | B28B 1/503<br>425/453 |

FOREIGN PATENT DOCUMENTS

| | | | | |
|---|---|---|---|---|
| CN | 101142153 A | 3/2008 | | |
| CN | 101879749 A | 11/2010 | | |
| CN | 102303357 A | 1/2012 | | |
| CN | 102441936 A | 5/2012 | | |
| DE | 1759360 A1 | 6/1971 | | |
| EP | 2829415 A1 * | 1/2015 | .............. | B44C 5/04 |
| JP | H11105020 A | 4/1999 | | |

(Continued)

*Primary Examiner* — Joseph S Del Sole
*Assistant Examiner* — Thu Khanh T Nguyen
(74) *Attorney, Agent, or Firm* — Pearne & Gordon LLP

(57) ABSTRACT

A feeding device for a press comprising: a first belt (2), movable in advancement along a conveying direction (X) and passing through a press (11, 12); depositing means (3), predisposed for spreading in a layer an amount (L) of loose material (L) on a movable plane. The device comprises a second belt (4), on which the depositing means (3) operate, located upstream of the first belt (2), which is movable along the conveying direction (X) and is substantially aligned and contiguous to the first belt (2). The first belt (2) and second belt (4) are movable independently of one another.

18 Claims, 6 Drawing Sheets

(56) References Cited

FOREIGN PATENT DOCUMENTS

| | | | |
|---|---|---|---|
| RU | 69448 | U1 | 12/2007 |
| RU | 2496637 | C1 | 10/2013 |
| WO | 8905223 | A1 | 6/1989 |
| WO | 9615888 | A1 | 5/1996 |
| WO | 2006099894 | A1 | 9/2006 |

* cited by examiner

FEEDING DEVICE FOR A PRESS

The present invention relates to a feeding device for a press.

A method for the production of ceramic slabs is currently known and widespread which envisages feeding a layer of ceramic material in powder and/or granules onto a conveyor belt which, at least for a portion, transits between the two die halves of a press. The pressing of the layer of ceramic material takes place directly on the conveyor belt during a stopping step whose duration depends on the time required by the press for performing its work cycle.

In the systems currently available the layer of ceramic material is fed, through specific spreading means, directly onto the same conveyor belt that transits through the press. The spreading means are located along the conveyor belt upstream of the press.

The necessary speed of the conveyor belt for having precise spreading of the layer of ceramic material must be substantially constant and is decisively lower than the maximum speed usable for transferring the same layer in advancement towards the press, considering the maximum accelerations and decelerations usable so as not to compromise the structure of the layer itself.

This means that the maximum speed to be used for the conveyor belt is substantially the maximum speed that allows sufficiently precise spreading of the powders to be obtained. Normally, speeds very close to the maximum limit tend to be used so as to maintain the highest production rhythm possible. This means that the spreading of the layer to be pressed is not always as precise as it may be if the conveyor belt were travelling at a lower speed.

The aim of the present invention is to offer a feeding device for a press that makes it possible to overcome the drawbacks of the currently available devices.

An advantage of the feeding device according to the present invention is that it allows the production rhythm of the line to be notably increased.

A further advantage of the feeding device according to the present invention is that it allows the spreading precision of the layer to be pressed to be increased.

Further characteristics and advantages of the present invention will become more apparent in the following detailed description of an embodiment of the present invention, illustrated by way of non-limiting example in the attached figures, in which:

FIG. 1 illustrates a schematic and vertical elevation view of the feeding device according to the present invention;

FIG. 1*a* illustrates a schematic and vertical elevation view of a second embodiment of the feeding device according to the present invention;

Figure 4:
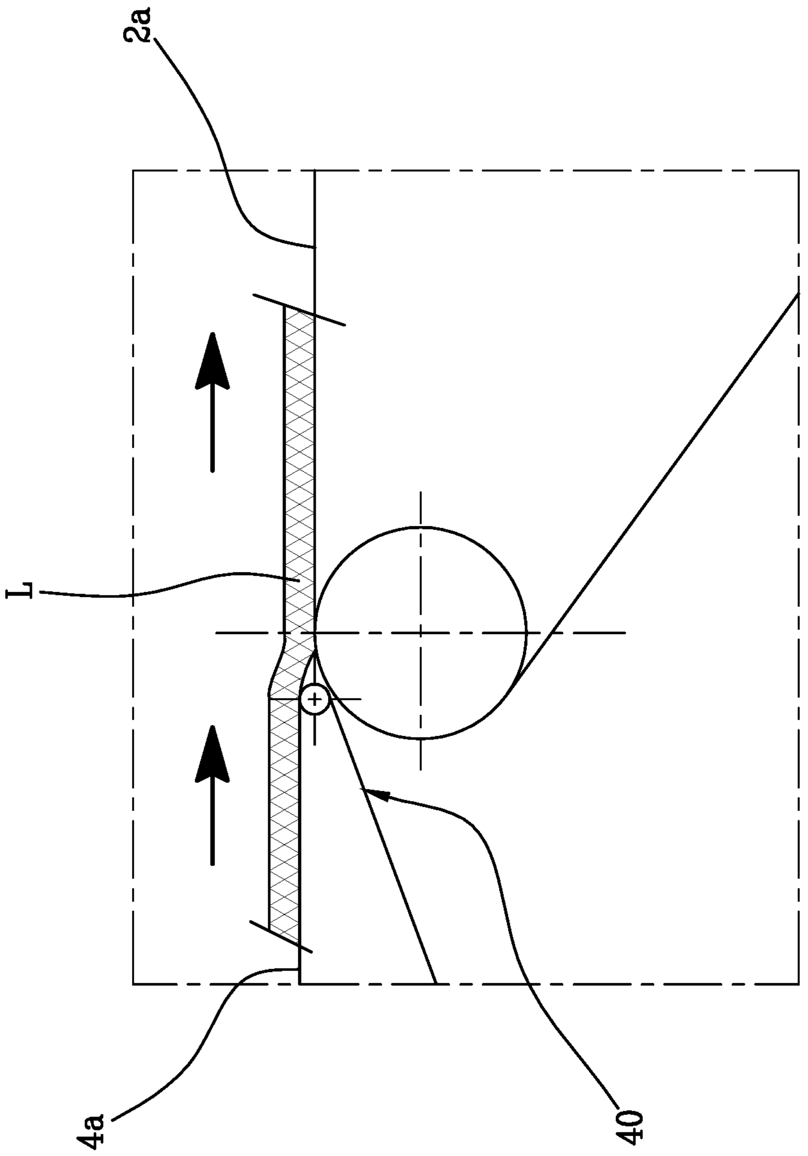

FIG. 4 schematically illustrates a zone of the machine during a step of conveying an amount of material (L)

Figure 5:
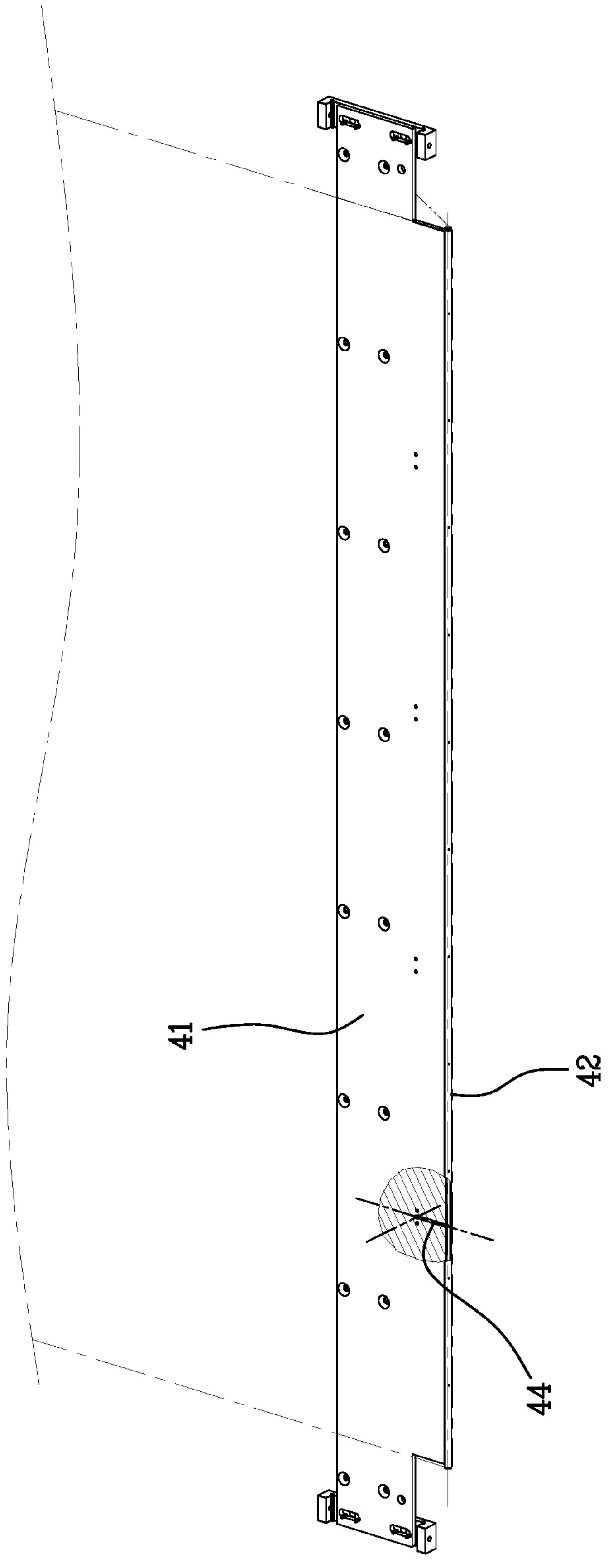
Figure 5A:
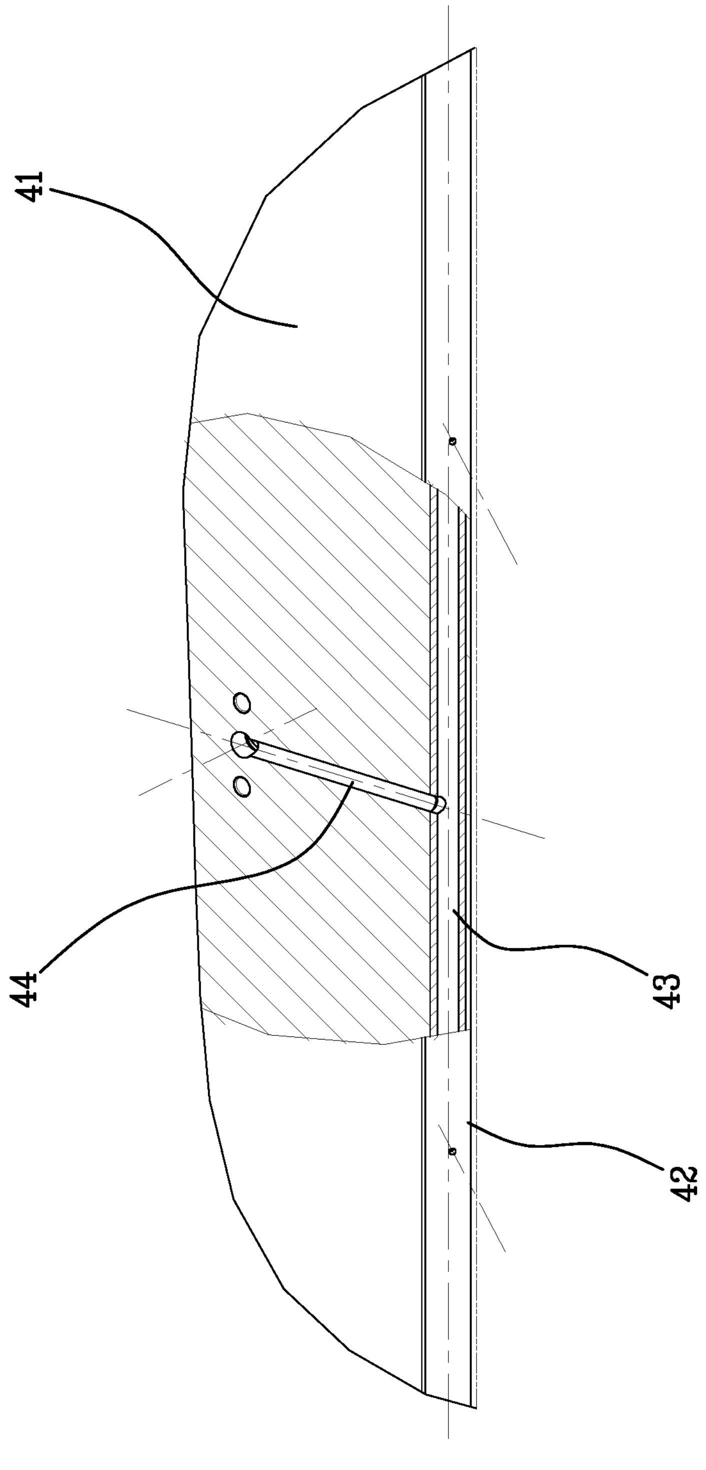

FIG. 5 illustrates a component of the device, in an axonometric view;

FIG. 5*a* illustrates an enlargement of a zone of FIG. 5.

The feeding device for a press according to the present invention comprises a first belt (2) movable along a closed looped path that has at least one forward portion (2*a*). The belt (2) is movable forwards along such forward portion (2*a*) according to a conveying direction (X) passing through a press (11,12). The looped path also comprises a return portion, joined to the forward portion.

The press comprises an upper pad (11) and a lower pad (12) movable with respect to one another in the vertical direction between a loading position, in which they can receive an amount of loose material (L) deposited in a layer on the first belt (2), and a pressing position, in which they are squeezed together so as to press the amount (L) directly onto the first belt (2) which is equally squeezed between the two press pads. The press (11,12) is known in the sector and will therefore not be described in further detail.

Figure 1:
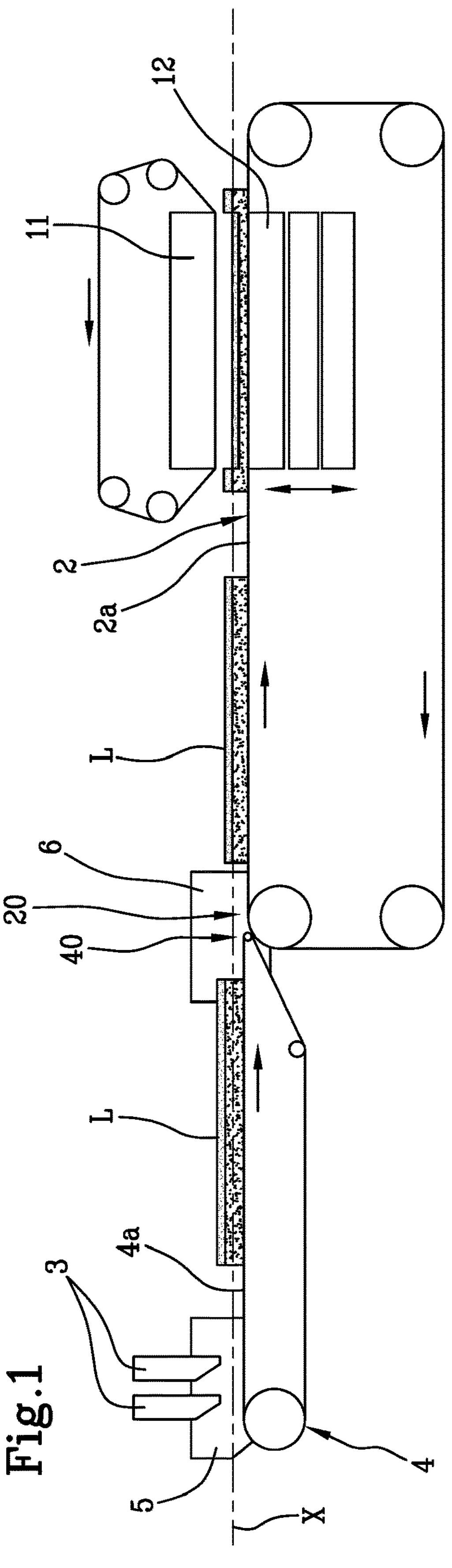
Figure 2:
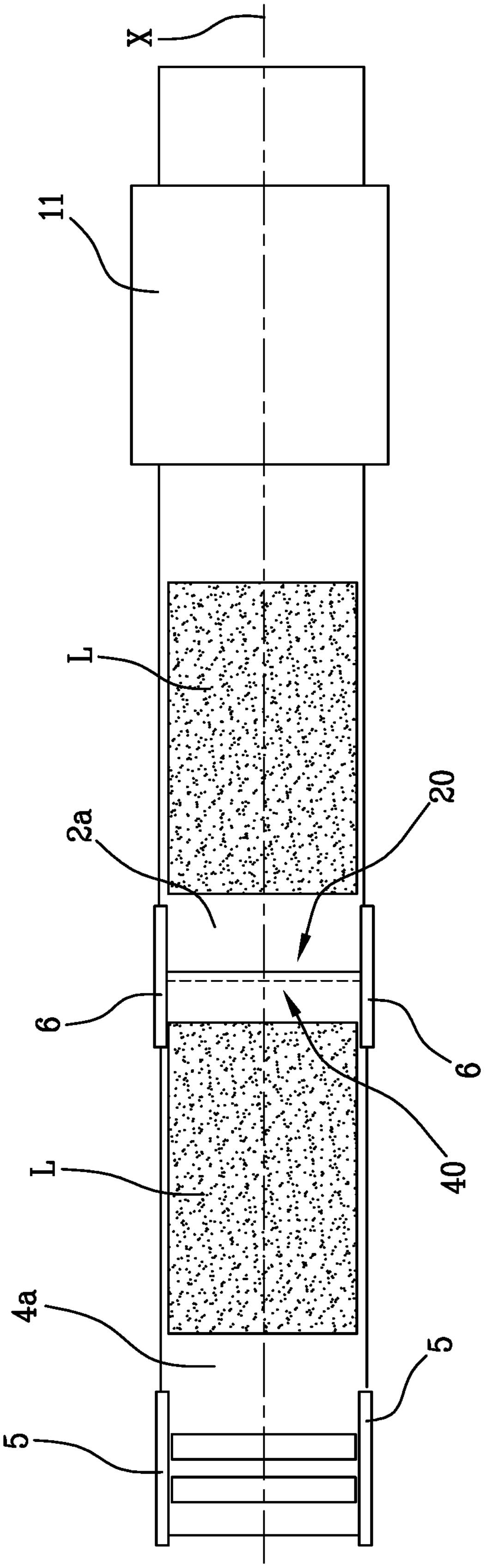
FIG. 2 illustrates a view from above of the device of FIG. 1.
Figure 3:
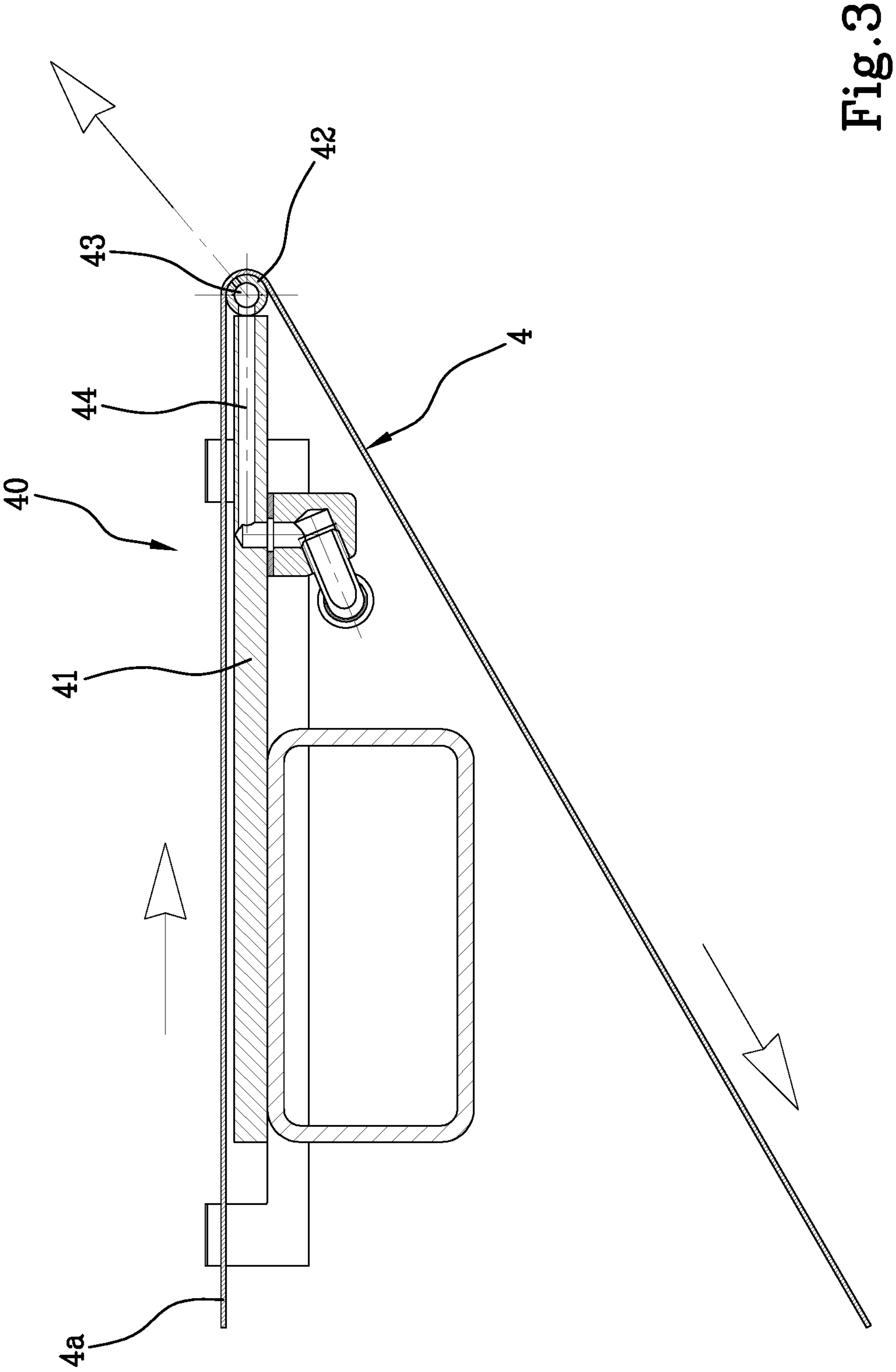
FIG. 3 illustrates an enlargement of a zone of FIG. 1.

Depositing means (3) are provided for spreading an amount of loose material (L) in a layer on a movable plane. Such depositing means comprise one or more hoppers which, when controlled, release by gravity the loose material which is deposited onto the movable plane below, being arranged in a layer. Purely by way of example, FIGS. 1 and 2 show two hoppers that deposit two layers to compose the amount (L). In any case, as already specified, the number and arrangement of the hoppers may vary according to requirements. In the devices currently available, the movable plane on which the loose material is deposited is the first belt (2). The device according to the present invention comprises a second belt (4), also movable along a closed looped path which has a forward portion (4*a*) and a return portion. The second belt (4) is located upstream of the first belt (2), so that the relative forward portion (4*a*) is substantially aligned and contiguous to the forward portion (2*a*) of the first belt (2) along the conveying direction (X). Unlike what happens in devices of the known type, the depositing means (3) operate on the second belt (4), in particular on the forward portion (4*a*). In other words, the amounts (L) are deposited on the second belt (4).

As illustrated in FIG. 1, the second belt (4), and in particular the forward portion (4*a*), comprises a front end (40) which defines a terminal portion at which the second belt (4) defines a return bend that joins the forward portion (4*a*) to the return portion. The front end (40) of the second belt (4) is at least partially above a rear end (20) of the first belt (2), at a slightly greater height with respect to the second belt (2). In this way, the forward portions (4*a*,2*a*) of the second belt (4) and the first belt (2) define a continuous path along the conveying direction (X), i.e. a path free from interruptions along the conveying direction (X). By activating in synchronised advancement the first and the second belt (2,4), i.e. at the same advancement speed, the amount (L) is transferred from the second belt (4) to the first belt (2) performing a modest jump downwards at the front end (40) of the second belt (4). This allows to prevent any remixing and any deformation of the amount (L).

The first belt (2) and the second belt (4) are movable independently from one another, i.e. each belt is equipped with its own motor means activatable independently from the motor means of the other belt.

The presence of a first and a second belt independent from one another allows all the drawbacks of the devices currently available to be overcome. In particular, the second belt (4) may be activated so as to assume a constant speed during the deposition of each amount (L), for example about 8-10 m/min.

Once the amount (L) has been deposited, the second belt (4) can be accelerated to the speed at which the first belt (2) feeds the amounts (L) to the press (11,12) for example about 50 m/min. The transfer of the amount (L) from the second belt (4) to the first belt (2) therefore takes place at a constant and equal speed for both belts. The two belts (2,4) may be synchronised with one another so that, for example, the transfer of one amount (L) from the second belt (4) to the first belt (2) takes place during the evacuation from the press (11,12) of an already pressed amount (L), keeping in due consideration the acceleration and deceleration steps necessary for allowing the transfer to take place at the same constant speed for both belts (2,4). This means that the activation of the first belt (2) does not have to keep in consideration the deposition step of the amounts (L) and can therefore take place at higher speeds with respect to the devices currently available. At the same time, the deposition of the amounts (L) can take place at low speed, so as to allow great deposition precision, without slowing down the production rhythm of the press (11,12).

The forward portion (2a) of the first belt (2) which precedes the press (11,12) may be extended for a desired length, so as to allow the accumulation in a row of a prefixed number of amounts (L) to be pressed.

The second belt (4) comprises a guide element (41), arranged at a terminal end (40), around which the second belt (4) is folded to define a return bend with respect to the conveying direction (X). Such return bend joins the forward portion (4a) with the return portion of the second belt (4) and defines the end of the forward portion (4a) itself.

The guide element (41) comprises a rectilinear edge (42), preferably arranged perpendicular to the conveying direction (X) around which the second belt (4) is slidable, so as to define the return bend with respect to the conveying direction (X). The second belt (4) slides directly on the rectilinear edge (42) which has a rounded shape, preferably cylindrical.

The use of the guide element (41), equipped with a rectilinear edge (42) on which the second belt (4) slides to define its return bend, allows the radius of curvature followed by the second belt (4) itself to be notably reduced at the end of its forward portion, i.e. at its own terminal end (40) in which the amount (L) is transferred to the first belt (2). A contained radius of curvature allows the terminal end (40) of the second belt (4) to be suitably moved towards the forward portion (2a) of the first belt (2), both in the vertical and in the horizontal direction. In this way, the transfer of the amounts (L) from the second belt (4) to the first belt (2) takes place with a very contained jump which does not compromise the structure of the amounts (L).

Preferably the guide element (41) is equipped with means for sending an air flow between the rectilinear edge (42) and the second belt (4). Such air flow cools the rectilinear edge (42) and the second belt (4), notably facilitating its sliding. Sending the air flow between the rectilinear edge (42) and the second belt (4) further allows the use of other sliding means to be avoided, such as rollers or bearings, which would produce an increase in the radius of curvature of the terminal end (40).

In a preferred embodiment the means for sending an air flow comprise a manifold (43), passing through the rectilinear edge (42) and provided with a plurality of outlet holes which open on the surface of the rectilinear edge (42) itself. Exiting from the manifold (43) through the holes on the surface of the edge (42), the air forms a cushion which cools both the edge (42) itself, and the second belt (4) also reducing the sliding friction.

Preferably the manifold (43) is afforded concentrically to the rectilinear edge (42). For feeding the air to the manifold (43) one or more feeding conduits (44) are provided, associated with the guide element (41) and connected to a source of pressurised air and to the manifold (43) itself. Preferably the feeding conduits (44) are afforded in the guide element (41) and flow into the manifold (43) through suitable openings afforded on the rectilinear edge (42).

Figure 1A:
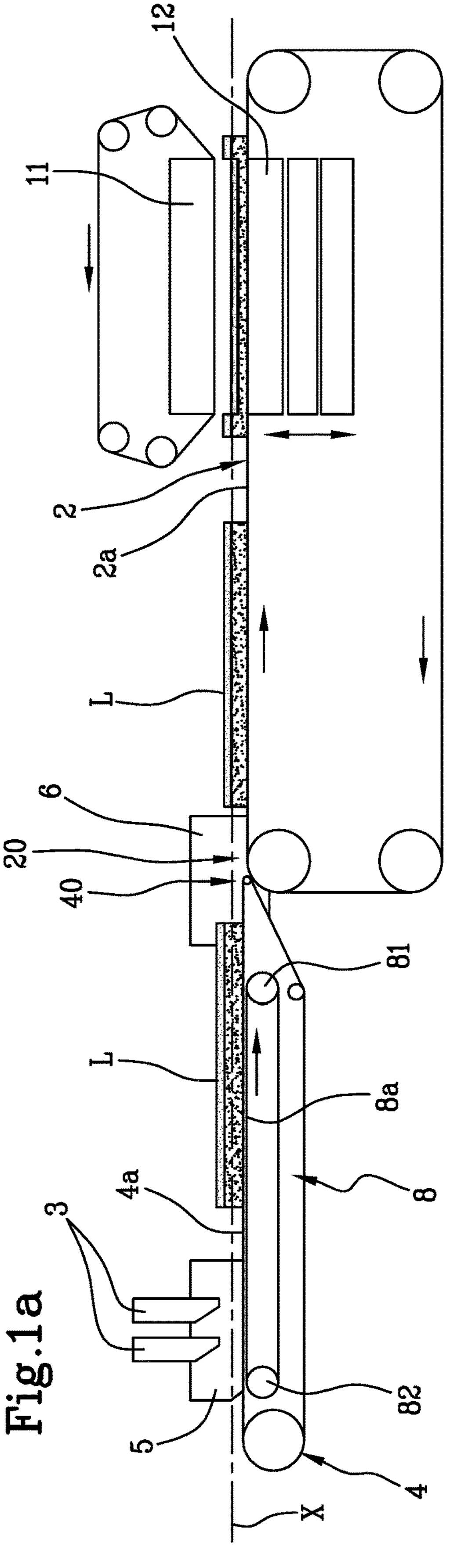

In a further possible embodiment, illustrated in FIG. 1a, the feeding device comprises a third belt (8), movable along a closed looped path which has a forward portion (8a) and a return portion. The forward portion (8a) is movable along the conveying direction (X).

The third belt (8) is located so that the forward portion (8a) is below the forward portion (4a) of the second belt (4). Preferably the forward portion (8a) of the third belt (8) is arranged in contact with the forward portion (4a) of the second belt (4).

In substance, the forward portion (8a) of the third belt (8) can support the forward portion (4a) of the second belt (4), for example, in the case in which the amounts (L) have a considerable weight that tends to make the second belt (4a) sag.

Preferably, the forward portion (8a) of the third belt (8) extends along a portion that comprises the deposit zone of the amounts (L) by the depositing means (3) and the whole portion of the second belt (4a) along which the amounts (L) transit.

The path of the third belt (8) extends within the path of the second belt (4). In the embodiment represented in FIG. 1a, the third belt (8) is arranged around two pulleys (81,82). At least one of the two pulleys is motorised by means of an actuator not shown. The position of at least one of the two pulleys is adjustable along the conveying direction (X), to allow the adjustment of the tension of the third belt (8).

Preferably the device comprises a pair of lateral barriers (5), arranged parallel to the conveying direction (X) at the depositing means (3). The lateral barriers (5) extend vertically upwards from the surface of the second belt (4), so as to constitute a side that laterally contains the amounts (L) during the deposition by the depositing means (3). This allows amounts to be obtained with a clearly defined conformation. Preferably the lateral barriers (L) are positioned within the width, measured perpendicularly to the conveying direction (X), of the second belt (4), a short distance from the lateral edges of the second belt (4) itself.

Preferably the device comprises a further pair of lateral barriers (6) arranged parallel to the conveying direction (X) at an initial portion of the first belt (2) and of a final portion of the second belt (4). In other words the lateral barriers (6) are arranged straddling the rectilinear edge (42) and extend in part along the second belt (4) and in part along the first belt (2), so as to laterally contain the amounts (L) during the transfer from the second to the first belt. The lateral barriers (6) allow the structure of the amounts (L) to be kept stable during the transfer from the second to the first belt. The lateral barriers (6) also extend vertically upwards from the surface of the second belt (4) and of the first belt (2), so as to constitute a side that laterally contains the amounts (L) during the transfer between the two belts. Preferably the lateral barriers (6) are positioned within the width, measured perpendicularly to the conveying direction (X), of the second belt (4) and of the first belt (2), a short distance from the lateral edges of the belts themselves. Furthermore, the barriers (6) preferably have at least one initial ramp, in which they are at a longer mutual distance, from which they converge in the conveying direction towards a central zone in which they are substantially parallel to one another. The initial ramp prevents any possible sticking of the amounts (L) against the barriers (6). Preferably the barriers (6) diverge from one another along the conveying direction into a terminal zone, to promote the exit of the amounts (L).

The invention claimed is:

1. A feeding device for a press comprising: a first belt (2), a second belt (4), and depositing means (3); the first belt (2)

having a forward portion (2a) movable in advancement along a conveying direction (X) and passing through a press (11,12), the depositing means (3) being located and configured and operable to spread an amount (L) of loose material in a layer on the second belt (4), which yields on the second belt (4) a layer of loose material to be pressed; the second belt (4) being located upstream of the first belt (2), the second belt (4) having a forward portion (4a) movable along the conveying direction (X) and being substantially aligned and contiguous to the forward portion (2a) of the first belt (2) so that, in operation, the forward portion (4a) of the second belt (4) deposits the layer of loose material to be pressed onto the forward portion (2a) of the first belt (2), the first belt (2) and the second belt (4) being movable independently of one another; wherein the forward portion (4a) of the second belt (4) comprises a front end (40) which is at least partially over a rear end (20) of the forward portion (2a) of the first belt (2).

2. The feeding device according to claim 1, wherein the front end (40) of the forward portion (4a) of the second belt (4) is at a greater height with respect to the rear end (20) of the forward portion (2a) of the first belt (2) where the front end (40) of the forward portion (4a) of the second belt (4) deposits the layer of loose material to be pressed onto the rear end (20) of the forward portion (2a) of the first belt (2) so that the layer of loose material drops from the front end (40) of the forward portion (4a) of the second belt (4) onto the rear end (20) of the forward portion (2a) of the first belt (2).

3. The feeding device according to claim 1, wherein the second belt (4) comprises a guide element (41), arranged at the front end (40), around which the second belt (4) is folded to define a return bend with respect to the conveying direction (X).

4. The feeding device according to claim 3, wherein the guide element (41) comprises a rectilinear edge (42) around which the second belt (4) is slidable, so as to define the return bend with respect to the conveying direction (X).

5. The feeding device according to claim 4, wherein the guide element (41) is equipped with means for sending an air flow between the rectilinear edge (42) and the second belt (4).

6. The feeding device according to claim 5, wherein the means for sending an air flow comprise a conduit (43), passing through the rectilinear edge (42) and provided with a plurality of outlet holes which open on the surface of the rectilinear edge (42).

7. The feeding device according to claim 1, comprising a pair of lateral barriers (5), arranged parallel to the conveying direction (X) relative to the depositing means (3), so as to laterally contain the amount (L).

8. The feeding device according to claim 1, comprising a pair of lateral barriers (6), arranged parallel to the conveying direction (X) at an initial portion of the first belt (2), so as to laterally contain the amount (L).

9. The feeding device according to claim 8, wherein the barriers (6) have at least one initial ramp, wherein they are located at a longer mutual distance from one another, wherefrom they converge along the conveying direction (X) towards a central zone, wherein they are substantially parallel one to another.

10. The feeding device according to claim 1, comprising a third belt (8) movable along a closed looped path which has a forward portion (8a) below the forward portion (4a) of the second belt (4).

11. The feeding device according to claim 10, wherein the forward portion (8a) of the third belt (8) is arranged in contact with the forward portion (4a) of the second belt (4).

12. The feeding device according to claim 10, wherein the path of the third belt (8) extends within the path of the second belt (4).

13. The feeding device according to claim 3, wherein the second belt (4), after it exits the return bend, slopes downwardly at an acute angle with respect to the forward portion (4a) of the second belt (4).

14. The feeding device according to claim 1, wherein the layer of loose material to be pressed is a layer of ceramic material to be pressed into a ceramic slab.

15. The feeding device according to claim 1, wherein a portion of the front end (40) of the second belt (4) extends further in the conveying direction (X) than a portion of the rear end (20) of the first belt (2).

16. The feeding device according to claim 1, wherein the layer of loose material to be pressed is powder and/or granules.

17. The feeding device according to claim 1, wherein the radius of curvature followed by the second belt (4) at the front end (40) is smaller than the radius of curvature followed by the second belt (4) at the end of the second belt (4) which is opposite the front end (40).

18. The feeding device according to claim 1, wherein the radius of curvature followed by the second belt (4) at the front end (40) is smaller than the radius of curvature followed by the first belt (2) at the rear end (20) of the first belt (2).

* * * * *